(12) United States Patent
Greiter

(10) Patent No.: US 12,237,755 B2
(45) Date of Patent: Feb. 25, 2025

(54) COOLANT SUPPLY FOR AN ELECTRIC VEHICLE AXLE DRIVE

(71) Applicant: AUDI AG, Ingolstadt (DE)

(72) Inventor: Ivo Greiter, Eitensheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/704,569

(22) PCT Filed: Jul. 21, 2022

(86) PCT No.: PCT/EP2022/070475
§ 371 (c)(1),
(2) Date: Apr. 25, 2024

(87) PCT Pub. No.: WO2023/072442
PCT Pub. Date: May 4, 2023

(65) Prior Publication Data
US 2024/0333104 A1     Oct. 3, 2024

(30) Foreign Application Priority Data
Oct. 28, 2021 (DE) ..................... 10 2021 128 081.8

(51) Int. Cl.
*H02K 9/193* (2006.01)
*H02K 7/00* (2006.01)
(Continued)

(52) U.S. Cl.
CPC ............. *H02K 9/193* (2013.01); *H02K 7/006* (2013.01); *H02K 7/116* (2013.01); *H02K 9/197* (2013.01); *H02K 2209/00* (2013.01)

(58) Field of Classification Search
CPC ........ H02K 9/193; H02K 9/197; H02K 7/116; H02K 7/006
(Continued)

(56) References Cited

U.S. PATENT DOCUMENTS

| | | |
|---|---|---|
| 2004/0134693 A1 | 7/2004 | Yamagishi et al. |
| 2013/0038151 A1 | 2/2013 | Ohashi et al. |

(Continued)

FOREIGN PATENT DOCUMENTS

| | | | |
|---|---|---|---|
| CN | 112867881 A1 | 5/2021 | |
| DE | 102020207841 A1 * | 12/2020 | ............... B60K 1/00 |

(Continued)

OTHER PUBLICATIONS

International Preliminary Report on Patentability issued on Feb. 22, 2024, in corresponding International Application No. PCT/EP2022/070475, 33 pages.

(Continued)

*Primary Examiner* — Jose A Gonzalez Quinones
(74) *Attorney, Agent, or Firm* — Maier & Maier, PLLC

(57) ABSTRACT

A coolant supply system for an electric vehicle axle drive having an electric machine, in the electric machine housing of which a stator interacts with a rotor. The electric machine outputs to at least one vehicle wheel of the vehicle axle via a transmission arrangement. A coolant separator is arranged in the electric machine housing, which divides the interior of the electric machine housing into a radially outer stator chamber, in which the stator with its stator windings is arranged, and into a radially inner rotor chamber, which is separated therefrom in a largely fluid-tight manner and in which the rotor is arranged.

19 Claims, 3 Drawing Sheets

(51) Int. Cl.
*H02K 7/116* (2006.01)
*H02K 9/197* (2006.01)

(58) Field of Classification Search
USPC .............................................. 310/52, 54, 58
See application file for complete search history.

(56) References Cited

U.S. PATENT DOCUMENTS

2019/0199173 A1   6/2019  Petit et al.
2020/0240512 A1*  7/2020  Yashiro ................... F01M 5/00
2021/0001714 A1*  1/2021  Oechslen ............... B60K 11/02

FOREIGN PATENT DOCUMENTS

| DE | 102019117893 A1 | 1/2021 | | |
|---|---|---|---|---|
| DE | 102019117893 B4 | 10/2021 | | |
| DE | 112020002018 T5 | 1/2022 | | |
| WO | WO-2020067259 A1 | * | 4/2020 | ............... H02K 9/19 |
| WO | 2020/213508 A1 | 10/2020 | | |

OTHER PUBLICATIONS

International Search Report issued on Nov. 16, 2022, in corresponding International Application No. PCT/EP2022/070475, 4 pages.
Examination Report issued on May 27, 2022, in corresponding German Application No. 102021128081.8, 15 pages.

* cited by examiner

COOLANT SUPPLY FOR AN ELECTRIC VEHICLE AXLE DRIVE

FIELD

The disclosure relates to a coolant supply for an electric vehicle axle drive.

BACKGROUND

Such a vehicle axle drive can have a wet-running electric machine in which the stator, in particular the winding heads of the stator windings, and the rotor are actively cooled.

In an exemplary coolant supply for an electric vehicle axle drive, the electric machine has an electric machine housing in which a stator interacts with a rotor. The coolant supply system is used for stator cooling, in which the coolant is fed at least into a winding head space of the electric machine. The winding head space in the electric machine extends in the radial direction between the radially inner rotor shaft and a radially outer cylindrical wall of the electric machine housing. In the axial direction, the winding head space extends between an end wall of the cylindrical electric machine housing and an end face of the stator/rotor arrangement. During electric machine operation, a coolant/air mixture moves in a vortex flow around the rotor shaft in the winding head space of the electric machine.

A generic coolant supply system and a drive train for a motor vehicle having a directly cooled electric machine is known from DE 10 2019 117 893 A1. Another wet-running electric machine is known from US 2019 0199173 A1. US 2004/134693 A1 discloses a cooling system for the electric motor of the vehicle. A drive device and a vehicle drive system are known from WO 2020/213508 A1.

SUMMARY

The object of the invention is to provide a coolant supply system for an electric vehicle axle drive which is structurally simpler than the prior art and/or in particular enables more effective cooling of the electric machine or transmission components in comparison to the prior art.

The invention is based on a coolant supply system for an electric vehicle axle drive, which has an electric machine in the electric machine housing of which a stator interacts with a rotor. The electric motor outputs via a transmission arrangement to at least one vehicle wheel of the vehicle axle. According to the characterizing part of claim 1, a coolant separator is arranged in the electric machine housing. This divides the interior of the electric machine housing into a radially outer annular stator chamber, in which the stator having its stator windings is arranged, and into a radially inner rotor chamber, which is largely separated therefrom in a fluid-tight or flow-tight manner and in which the rotor is arranged. In this way, the stator, which heats up strongly during electric machine operation, can be supplied with coolant in a more targeted manner. In addition, the coolant supply of the stator chamber is decoupled from the vortex flow that forms in the rotor chamber. The rotor is therefore less in contact with coolant. Rather, coolant can flow completely around the winding heads of the stator in particular. In this case, the stator chamber can be essentially completely filled with coolant.

The coolant separator is designed to be closed-surface (i.e., nozzle-free) and in sealing contact with the end walls of the electric machine housing, which are opposite to one another in the axial direction. A fluid-tight or flow-tight seal of the stator chamber from the rotor chamber does not necessarily mean a hermetic seal, i.e., a completely tight seal. Rather, during electric machine operation, a slight coolant leakage can occur through the sealing surfaces of the coolant separator into the rotor chamber. If necessary, the coolant separator can also be implemented as a so-called containment shell, i.e., from a pipe (for example made of plastic) which is drawn in between the rotor and the stator and is again sealed axially to the housing.

In a technical implementation, the coolant supply system has a stator hydraulic circuit and a rotor hydraulic circuit, which are at least partially fluidically decoupled from one another. The stator chamber is integrated in the stator hydraulic circuit, while the rotor is integrated in the rotor hydraulic circuit, in particular for internal rotor cooling.

According to the invention, the stator chamber has at least one drain point, from which the coolant flowing out of the stator chamber can be returned into a coolant reservoir. The rotor chamber can have at least one drain point from which the coolant flowing out of the stator chamber can be returned to the coolant reservoir. The coolant is returned by means of a return pump. In addition, the stator chamber can have an inlet point into which the coolant can be fed from the coolant reservoir to the stator chamber. The coolant feed can be assisted in particular by means of a feed pump. The most important thing here is that the stator chamber is completely filled with oil—for this purpose, a pump that conveys the oil therein is required and the drain has to be designed as an overflow, i.e., located at the top. In order to prevent oil from draining out of the stator chamber during high lateral accelerations, the drain has to be throttled either by an aperture or by a pressure relief valve.

The transmission arrangement has a transmission housing in which, for example, an axle differential is arranged. Its input side can be connected to the electric machine, directly or indirectly, for example at least via a gear stage provided for torque conversion. The output side of the axle differential is connected to the at least one vehicle wheel of the vehicle axle.

Alternatively and/or additionally, the invention relates to the coolant supply system described below for an electric vehicle axle drive, which has an electric machine in the electric machine housing of which a stator interacts with a rotor. The electric motor outputs via a transmission arrangement to at least one vehicle wheel of the vehicle axle. With regard to reducing the installation space of the coolant supply system and reducing the number of components, it is preferred if the coolant supply system does not have a separate coolant tank, but rather the transmission housing and, above all, the stator housing act in a double function as a coolant reservoir. In this case, the return pump and/or the feed pump can also be positioned directly in the transmission housing.

An additional space-saving and structurally simple design is achieved when the feed pump and the return pump are combined to form a dual pump having a common drive shaft. The common drive shaft in turn has a drive connection to an electric motor.

For a compact vehicle axle drive, it is preferred if the electric machine is installed transversely so that its rotor shaft extends in the vehicle transverse direction, i.e., axially parallel to the vehicle transverse axis. To further reduce installation space, the electric motor and the transmission arrangement can be arranged adjacent to one another in the vehicle transverse direction. In addition, the transmission housing can be flanged directly on the electric machine housing.

In a transmission housing designed in this way, a hollow body that is open at the top, in particular a shell, can be arranged. The hollow body shields a coolant-free installation space that is open at the top from the coolant column in the transmission housing. A transmission component, in particular the axle differential, can be arranged at least partially in the installation space that is open at the top. In this way, during normal operation, the transmission component is prevented from being immersed in the coolant column in the transmission housing.

The coolant supply system can include a transmission hydraulic circuit in addition to the stator hydraulic circuit and the rotor hydraulic circuit. The transmission hydraulic circuit can be used to supply at least one transmission component arranged in the transmission housing with coolant in dry sump lubrication or in injection lubrication. In this case, the coolant is supplied in a transmission supply line to a transmission component lubrication point. The transmission component supplied with coolant in dry sump lubrication or in injection lubrication can preferably protrude into the installation space provided by the hollow body. In this case, the coolant dripping from the transmission component can collect at the bottom of the hollow body and be returned in the direction of the coolant reservoir via a bottom-side drain point, in particular with the assistance of the return pump. Dry sump lubrication is to be understood as the circumstance that there is a space, i.e., a dry sump, into which the oil draining from the unit is actively returned, i.e., by a pump. In the wet sump, on the other hand, the oil flows by gravity into an area that is necessarily located at the bottom (oil pan). In the wet sump, for example, gears (in contrast to dry sump lubrication) can be lubricated by immersing them in the oil.

If the injection lubrication is not sufficient, the axle differential can also be internally oiled. Preferably, an oil feed is provided for the internal oiling of a possible decoupling.

In order to ensure an emergency supply of coolant to the transmission component even in the event of a pump failure of the return pump and/or the feed pump, the following measure can be provided: The hollow body can have an emergency inlet via which coolant can flow from the coolant column located in the transmission housing into the hollow body. In the event of a pump failure, an emergency supply of coolant to the transmission component is thus guaranteed. This is because the inflow of coolant via the emergency inlet creates a coolant column in the hollow body, into which the transmission component is immersed in the manner of a splash lubrication.

As already mentioned, the coolant separator between the radially outer stator chamber and the radially inner rotor chamber cannot provide a hermetic seal, resulting in leakage losses, in which a leaked coolant enters the rotor chamber from the stator chamber. The leaked coolant collects at the bottom of the rotor chamber, in particular on the inside of the coolant separator. In order to remove the leaked coolant from the rotor chamber, at least one rotor chamber drain point is formed on the rotor chamber floor, via which the leaked coolant can be returned to the coolant reservoir, in particular by means of the return pump.

The rotor hydraulic circuit can be specially designed for internal rotor cooling, in which the rotor shaft is designed as a hollow shaft. Coolant can at least partially flow through its cavity. After the internal rotor cooling has been completed, the coolant can be discharged into the rotor chamber, where it collects at the rotor chamber bottom. As already mentioned, at least one rotor chamber drain point can be formed on the rotor chamber bottom, via which the coolant can be returned to the coolant reservoir.

By means of the invention, a coolant supply system is provided having reduced component expenditure, but still having optimal efficiency and cooling performance.

BRIEF DESCRIPTION OF THE FIGURES

Exemplary embodiments of the invention are described in the following on the basis of the appended figures. In the figures.

DETAILED DESCRIPTION

Figure 3:
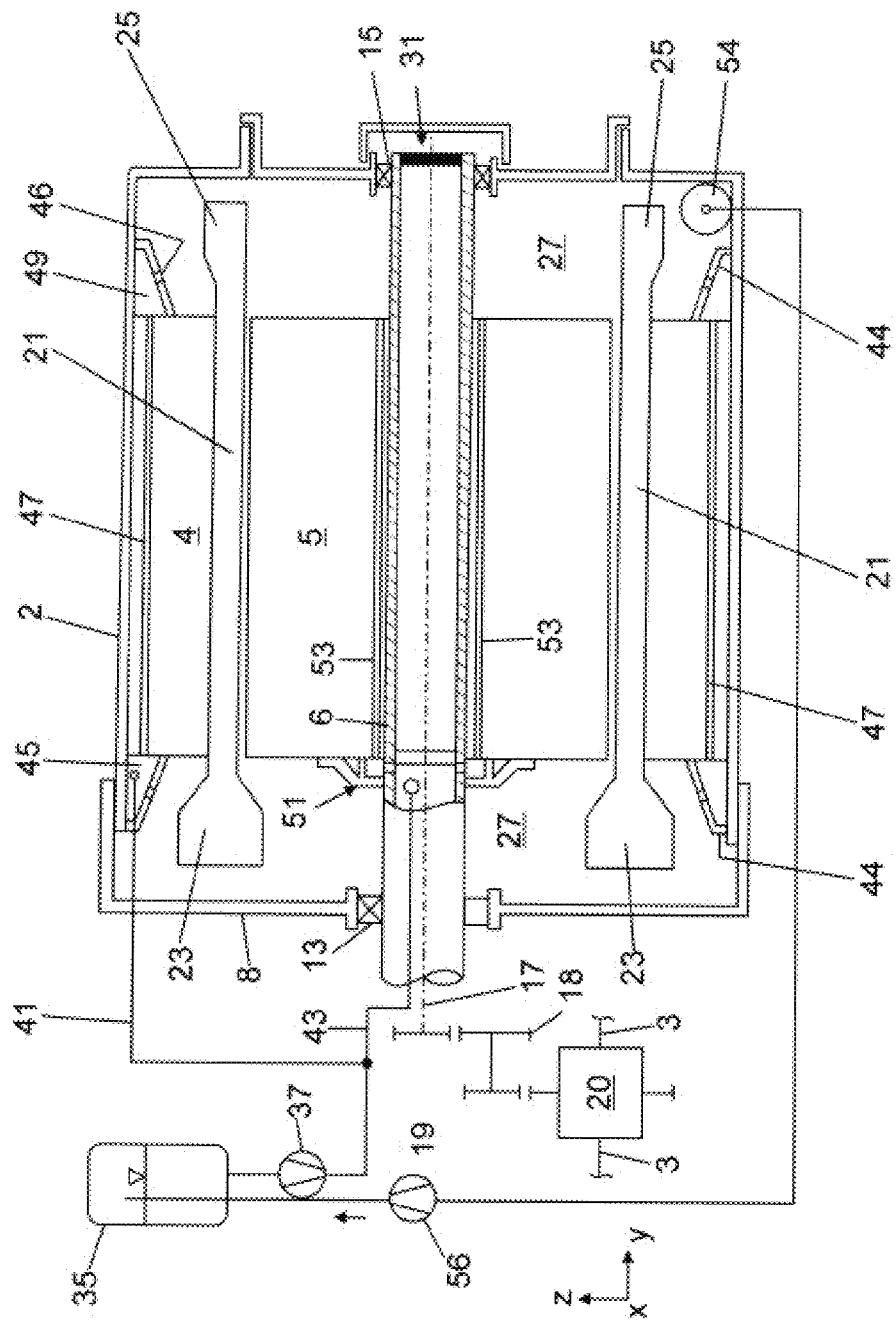
FIG. 3 shows a schematic representation of a comparative example not comprised by the invention.

For easier understanding of the invention, reference is first made to FIG. 3, in which a drive device for a vehicle axle of a two-track vehicle is indicated in a roughly schematic representation. The drive device has an electric machine which, when installed transversely, for example, is arranged axially parallel to the flange shafts 3 guided to the vehicle wheels. A stator 4 with a rotor 5 interacting therewith is arranged in a housing 2 of the electric machine. The rotor shaft 6 is rotatably mounted in bearing openings with pivot bearings 13, 15 interposed on axially opposite housing walls 8, 9 of the electric machine housing 2.

The rotor shaft 6 of the electric machine is connected in a rotationally fixed manner to a transmission input shaft 17 of a transmission arrangement 19, which outputs onto the two flange shafts 3. In FIG. 3, the transmission arrangement 19 is constructed from a gear stage 18 and an axle differential 20.

Figure 1:
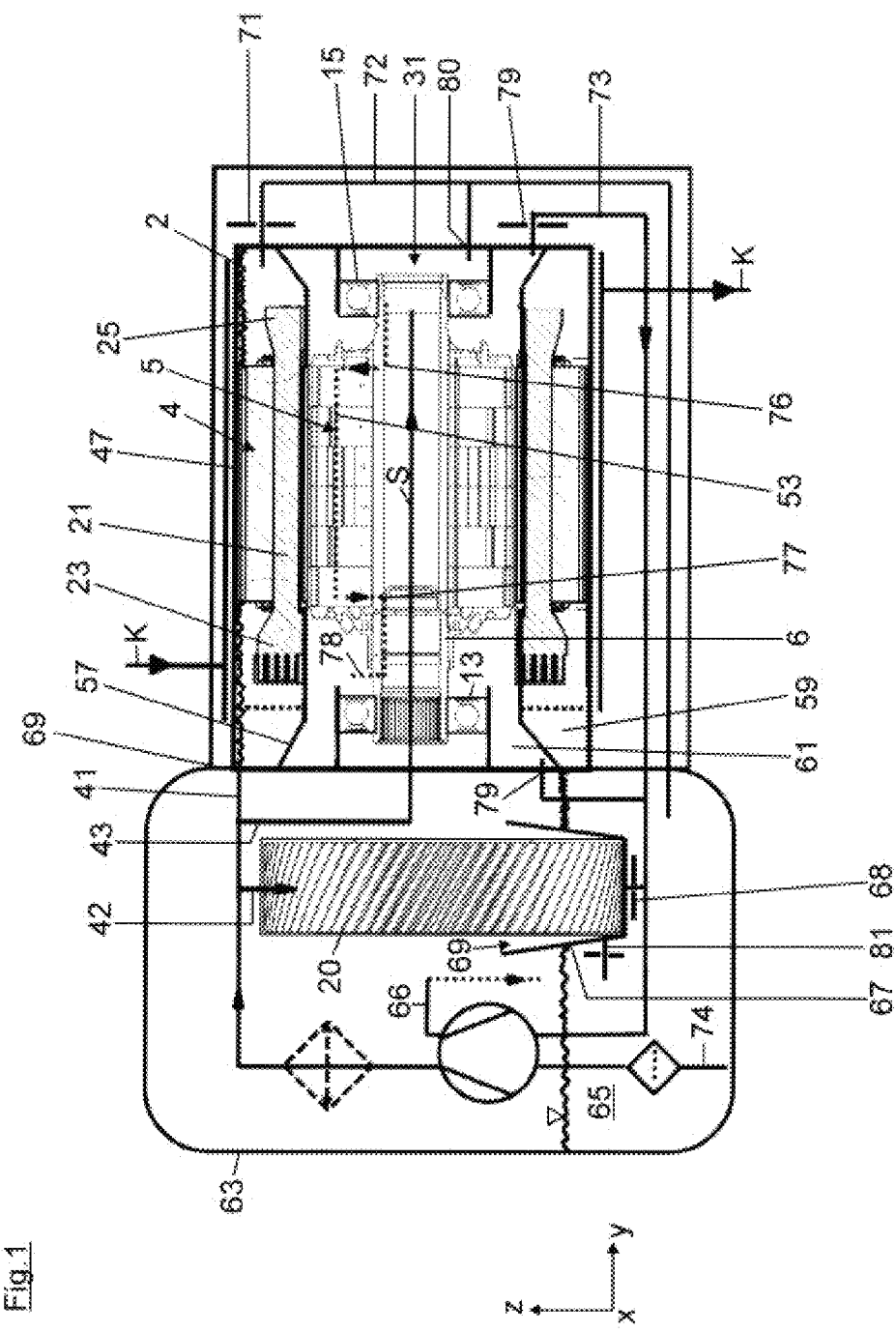
FIG. 1 shows a schematic representation of a first embodiment of a coolant supply system.

In FIG. 3, the stator 4 has a plurality of stator windings, of which only two stator windings 21 are indicated in FIG. 1. Each stator winding 21 has a winding head 23, 25 on both axial sides, which projects into a winding head space 27. Each winding head space 27 is integrated into an electric machine hydraulic circuit E described later, with the aid of which oil can be applied to the respective winding head space 27 in order to cool the winding heads 23, 25 of the stator 4. In each of the winding head spaces 27, an oil/air mixture moves in a vortex flow around the rotor shaft 5, which rotates at high speed.

In the bearing arrangement on the right in FIG. 3, one shaft end of the rotor shaft 6 is rotatably mounted in a hub section 31 via a pivot bearing 15.

The oil hydraulic circuit has an oil tank 35 which is connected to a feed pump 37 via a suction line. A pressure line leads from the feed pump 37 to oil supply lines 41, 43. By means of the supply line 41, oil is fed into a radially outer circumferential annular gap 45. From there, the oil is guided via radially outer stator channels 47 to a further annular gap 49 in the right winding head space 27. The two annular gaps 45, 49 are separated from the respective winding head space 27 via oil splash rings 44. Each of the oil splash rings 44 has nozzles 46 distributed in the circumferential direction, via which oil can be injected into the respective winding head space 27.

By means of the supply line 43, oil is guided through the rotor shaft 6 and conducted via a flow connection 51 into radially inner stator channels 53 into the right winding head space 27. In FIG. 3, there is a suction point 54 on the housing bottom of the electric machine housing, via which oil collecting on the housing bottom can be returned to the oil tank 35 with the aid of a return pump 56.

Figure 2:
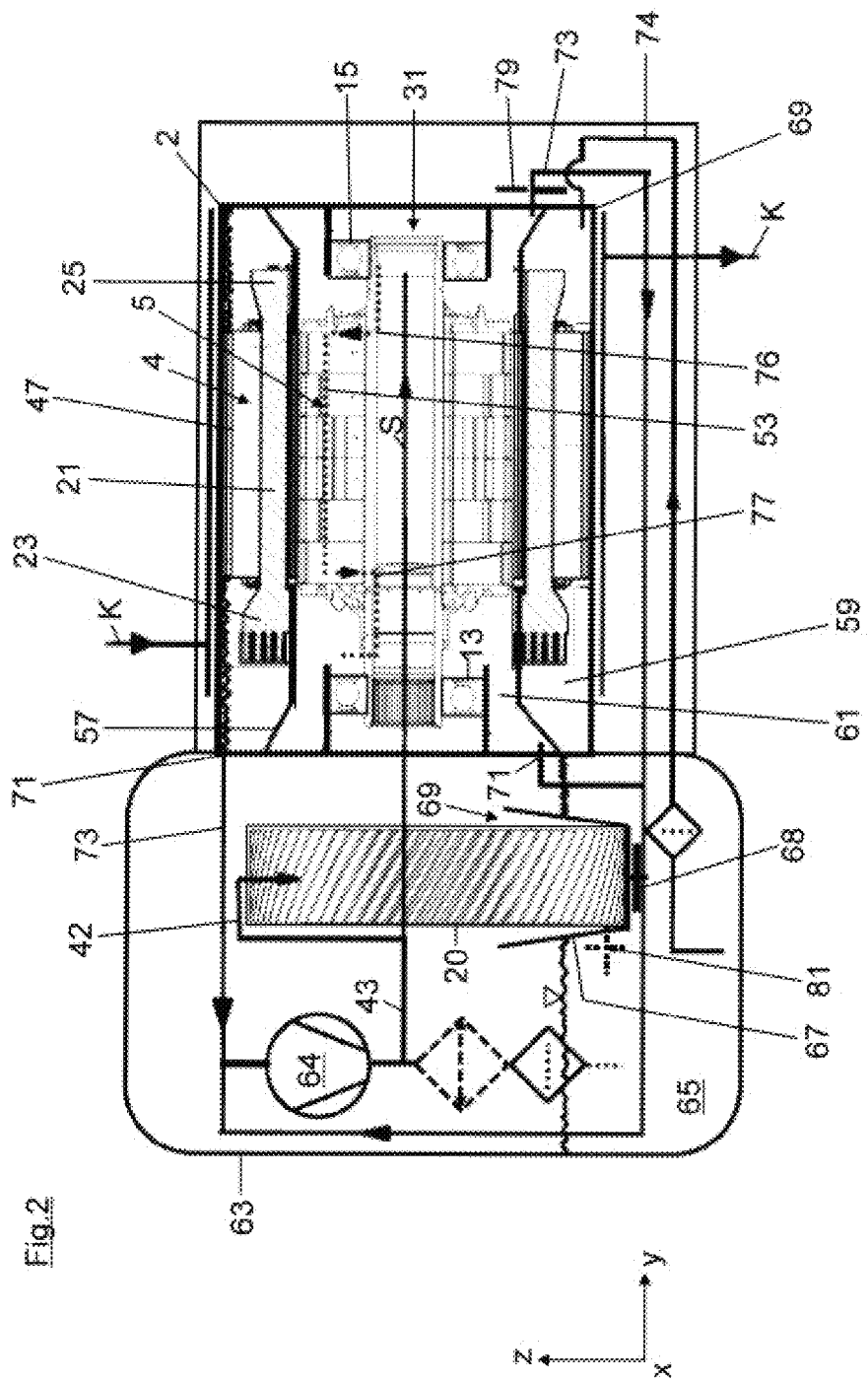
FIG. 2 shows a schematic representation of a second embodiment of a coolant supply system.

In contrast to FIG. 3, in FIG. 1 or 2, according to the invention, the stator 4 having its winding heads 23, 25 is no longer cooled by means of an air/oil vortex flow. Rather, the interior of the electric machine housing 2 is divided by means of a coolant separator 57 into a radially outer annular stator chamber 59 and a radially inner rotor chamber 61. The stator 4 with its stator windings 21 is positioned in the stator chamber 59, while the rotor 5 is arranged in the radially inner rotor chamber 61, separated from it in a fluid-tight manner. According to the invention, the stator 4 therefore no longer comes into cooling contact with a vortex flow forming in the rotor chamber 61. Rather, in FIG. 1, the stator chamber 59 is completely filled with the coolant during electric machine operation, so that the coolant especially flows completely around the winding heads 23, 25, which results in better efficiency in comparison to vortex flow cooling. However, the core concept of the invention is first to house the coolant in the unit at a location (i.e., in the stator chamber 59) where it is needed anyway. Second, the invention keeps the coolant largely out of the rotor chamber 61. This because when using the spray oil cooling known from the prior art from FIG. 3, there is a problem in that, depending on the temperature of the coolant, very different amounts of coolant remain on the winding. In order to provide a sufficient amount of coolant for the pressure pump, a comparatively large amount of coolant has to be added.

As can be seen from FIG. 1, the electric machine is installed transversely in the vehicle, analogous to FIG. 3, having a rotor shaft 6 extending in the vehicle transverse direction y, i.e., axially parallel to the vehicle axis. In addition, in FIG. 1 the electric machine and the transmission arrangement 19 are arranged adjacent to one another in the vehicle transverse direction y. The transmission housing 63 of the transmission arrangement 19 is also flanged directly to the electric machine housing 2. The transmission arrangement 19 is positioned in the transmission housing 63 and, according to FIG. 3, has the gear stage 18 and the axle differential 20.

A core concept of the invention is that a separate oil tank (reference number 35 in FIG. 3) is dispensed with and instead the transmission housing 63 in a double function additionally acts as an oil tank or as a coolant reservoir in which an oil column 65 is formed. In addition, the feed pump 37 and return pump 56 shown in FIG. 3 are combined to form a common dual pump 64. In the dual pump 64, the feed and return pumps 37, 56 are driven by an electric motor using a common drive shaft (not shown).

As can be seen from FIG. 1, a shell 67 which is open at the top is positioned as a hollow body at the bottom of the transmission housing 63 and shields a coolant-free installation space 69 which is open at the top from the oil column 65. The axle differential 20 partially protrudes into the installation space 69. Normally, injection lubrication occurs, in which oil is fed via the transmission supply line 42 in the direction of the axle differential 20. The coolant dripping from the axle differential 20 collects at the bottom of the shell 67 and is led from there via a drain point 68 into a return line 73 which is connected to the suction side of the dual pump 64.

During electric machine operation, oil is fed into the stator chamber 59 via the supply line 41 at an inlet point 69 near the transmission by means of the dual pump 64. The oil is drained from the stator chamber 59 at an axially opposite drain point 71, remote from the transmission. The stator chamber drain point 71 remote from the transmission can be implemented as an aperture, possibly also as a pressure relief valve. The stator chamber drain point 71 also has a flow connection via a first return line 72 to the oil column 65 located in the transmission housing 63, into which the first return line 72 opens. In addition, oil can accumulate within the hub section 31 of the pivot bearing 15 remote from the transmission, which oil can also be led into the first return line 73 via a further drain point 80.

In FIG. 1, the coolant supply system is used to cool the rotor internally, resulting in the oil guidance S shown in FIG. 1. The oil guidance S in the rotor shaft 6 is designed such that both the bearing 13 close to the transmission and the bearing 15 remote from the transmission are cooled from the inside. The goal of the oil guidance S is to achieve the smallest possible temperature difference between the inner ring and the outer ring of the respective bearing 13, 15.

According to the oil guidance S, the oil is fed via the supply line 43 into the cavity of the rotor shaft 6, which is designed as a hollow shaft, up to the axial height of the rotary bearing 15 remote from the transmission. From there, the oil is guided into the rotor channels 53 via a flow connection 76 remote from the transmission. In the rotor channels 53, the oil flows in the further course in the opposite direction to a flow connection 77 near the gear, where the oil is returned to the cavity of the rotor shaft 6. The returned oil is led from the rotor shaft 6 via a drain point 78 into the rotor chamber 61. There, the oil collects at the bottom of the rotor chamber, from where it is led into the second return line 73 via rotor chamber drain points 79 formed on both sides of the electric machine housing 2. This is connected to the suction side of the dual pump 64.

In FIG. 1, the dual pump 64 has a riser line 66 on its pressure side, via which the returned oil is fed into the transmission housing 63. In addition, a suction line 74 is connected to the suction side of the dual pump 64, which is fluidically connected to the oil column 65.

As can be seen from FIG. 1, an emergency inlet 81 is formed on a wall of the shell 67, via which oil can flow from the coolant column 65 located in the transmission housing 63 into the shell 67. In the event of a pump failure, an emergency supply of coolant to the axle differential 20 is thus ensured, in which a coolant column forms in the shell 67, into which the axle differential 20 can immerse itself as in a splash lubrication system. In FIG. 1, the emergency inlet 81 is a bottom-side opening in the shell 67. Alternatively, the emergency inlet 81 can also be implemented as an upper overflow edge of the shell 67.

FIG. 2 shows a second exemplary embodiment of the invention, the structure and mode of operation of which essentially corresponds to the structure and mode of operation of the first embodiment. In FIG. 2, the oil flow direction in the stator hydraulic circuit is reversed. This means that the return line 73 is connected to a stator chamber drain point 71 close to the transmission. This is connected to the suction side of the dual pump 64. In contrast, a suction line 74 is connected to the stator chamber inlet point 69 remote from the transmission, via which the oil is sucked in from the oil column 65 located in the transmission housing 63.

The transmission housing 63 can be designed to be so narrow in the vehicle transverse direction y that during vehicle lateral acceleration the suction line 74 is always immersed in the coolant column 65 and thus oil suction is ensured. The coolant supply system is designed such that the dual pump 64 only sucks oil out of the transmission housing 63 via a single suction point (i.e., suction line 74). The suction point is to be positioned in the vehicle longitudinal direction x in such a way that oil is reliably sucked in during positive or negative longitudinal acceleration and splashes into the shell 67 under the differential chamber when the acceleration has a different sign.

In FIGS. 1 and 2, the electric machine is additionally integrated in a cooling water circuit K, in which the cooling water flows around the outer circumference of the electric machine housing 2.

LIST OF REFERENCE NUMERALS 2 electric machine housing
3 flange shafts
4 stator
5 rotor
6 rotor shaft
68 housing wall
11 bearing opening
13, 15 pivot bearing
17 transmission input shaft
18 gear stage
19 transmission arrangement
20 axle differential
21 stator winding
23, 25 winding head
27 electric machine chamber
31 hub section
33 sealing element
35 coolant tank
37 feed pump
41, 43 coolant supply lines
44 oil splash ring
45 annular gap
46 nozzles
47 radially outer stator channel
49 annular gap
51 flow connection
53 radially inner stator channel
54 suction point
56 return pump
57 coolant separator
59 stator chamber
61 rotor chamber
63 transmission housing
64 dual pump
65 coolant column
66 riser
67 hollow bodies
68 hollow body discharge point
69 stator chamber inlet point
71 stator chamber discharge point
72 further return line
73 return line
74 suction line
76 flow connection remote from the transmission
77 flow connection near the transmission
78 drain point
79 rotor chamber drain point
80 hub section drain point
81 emergency inlet
S oil supply for internal rotor cooling
K cooling water circuit

The invention claimed is:

1. A coolant supply system for an electric vehicle axle drive comprising:
   an electric machine configured to output to at least one vehicle wheel of the electric vehicle drive via a transmission arrangement;
   an electric machine housing, wherein stator is configured to interact with a rotor, a coolant separator is arranged that divides an interior of the electric machine housing into a radially outer stator chamber and a radially inner rotor chamber, which is separated therefrom in a largely fluid-tight manner and in which the rotor is arranged, and the radially outer stator chamber has a drain point from which coolant flowing out of the radially outer stator chamber is configured to be returned to a coolant reservoir by a return pump, and a feed pump and the return pump are combined to form a common dual pump.

2. The coolant supply system according to claim 1, wherein the stator chamber is part of a stator hydraulic circuit, and the rotor chamber is part of a rotor hydraulic circuit.

3. The coolant supply system according to claim 1, wherein the transmission arrangement has a transmission housing that forms the coolant reservoir in which a coolant column is located, an axle differential is arranged in the transmission housing, an input side of the axle differential is connected to the electric machine, via a gear stage for torque conversion, and an output side of the axle differential is connected to the at least one vehicle wheel of the electric vehicle axle drive.

4. The coolant supply system according to claim 3, wherein the return pump and the feed pump are arranged in the transmission housing.

5. The coolant supply system according to claim 3, further comprising:
   a hollow body, open on top and arranged in the transmission housing, is configured to shield a coolant-free installation space that is open on top from the coolant column located in the transmission housing, and the axle differential protrudes into the coolant-free installation space.

6. The coolant supply system according to claim 1, further comprising:
   a transmission hydraulic circuit in which at least one transmission component arranged in the transmission housing is configured to be supplied with coolant in a dry sump lubrication or an injection lubrication by the feed pump, for the injection lubrication, the coolant is guided from a transmission supply line to a transmission component lubrication point, the coolant dripping from the transmission component lubrication point collects at a bottom of a hollow body, and, at the bottom of the hollow body, a drain point is formed, via which the coolant is configured to be returned in a direction of the coolant reservoir, in particular by the return pump.

7. The coolant supply system according to claim 5, wherein the hollow body has an emergency inlet via which coolant is configured to flow from the coolant column located in the transmission housing into the hollow body, so that, after a pump failure, an emergency coolant supply to immerse the transmission component is ensured by a coolant column that is configured to form in the hollow body.

8. The coolant supply system according to claim 1, wherein a leaked coolant collects at a bottom of the rotor chamber on the coolant separator, and at least one rotor chamber drain point is formed at the bottom of the rotor chamber, via which the coolant can be returned to the coolant reservoir by the return pump.

9. The coolant supply system according to claim 1, wherein the stator chamber is substantially completely filled with coolant, and the rotor shaft is configured as a hollow shaft through which coolant is configured to flow.

10. The coolant supply system according to claim 2, wherein the transmission arrangement has a transmission housing that forms the coolant reservoir in which a coolant column is located, an axle differential is arranged in the transmission housing, an input side of the axle differential is connected to the electric machine via a gear stage for torque conversion, and an output side of the axle differential is connected to the at least one vehicle wheel of the electric vehicle axle drive.

11. The coolant supply system according to claim 4, further comprising: a hollow body is open on top and arranged in the transmission housing, is configured to shield a coolant-free installation space that is open on top from the coolant column located in the transmission housing, and the axle differential, protrudes into the coolant-free installation space.

12. The coolant supply system according to claim 2, further comprising:
a transmission hydraulic circuit in which at least one transmission component arranged in the transmission housing is configured to be supplied with coolant in a dry sump lubrication or an injection lubrication by the feed pump, for the injection lubrication, the coolant is guided from a transmission supply line to a transmission component lubrication point, the coolant dripping from the transmission component lubrication point collects at the bottom of the hollow body, and, at the bottom of the hollow body, a drain point is formed, via which the coolant is configured to be returned in the direction of the coolant reservoir by the return pump.

13. The coolant supply system according to claim 3, further comprising:
a transmission hydraulic circuit in which at least one transmission component arranged in the transmission housing is configured to be supplied with coolant in a dry sump lubrication or an injection lubrication by the feed pump, for the injection lubrication, the coolant is guided from a transmission supply line to a transmission component lubrication point, the coolant dripping from the transmission component lubrication point collects at the bottom of the hollow body, and at the bottom of the hollow body, a drain point is formed, via which the coolant is configured to be returned in the direction of the coolant reservoir by the return pump.

14. The coolant supply system according to claim 4, further comprising:
a transmission hydraulic circuit in which at least one transmission component arranged in the transmission housing is configured to be supplied with coolant in a dry sump lubrication or an injection lubrication by the feed pump, for the injection lubrication, the coolant is guided from a transmission supply line to a transmission component lubrication point, the coolant dripping from the transmission component lubrication point collects at the bottom of the hollow body, and at the bottom of the hollow body, a drain point is formed, via which the coolant is configured to be returned in the direction of the coolant reservoir by the return pump.

15. The coolant supply system according to claim 5, further comprising:
a transmission hydraulic circuit in which at least one transmission component arranged in the transmission housing is configured to be supplied with coolant in a dry sump lubrication or an injection lubrication by the feed pump, for the injection lubrication, the coolant is guided from a transmission supply line to a transmission component lubrication point, the coolant dripping from the transmission component lubrication point collects at the bottom of the hollow body, and, at the bottom of the hollow body, a drain point is formed, via which the coolant is configured to be returned in the direction of the coolant reservoir by the return pump.

16. The coolant supply system according to claim 6, wherein the hollow body has an emergency inlet via which coolant is configured to flow from the coolant column located in the transmission housing into the hollow body, so that, after a pump failure, an emergency coolant supply to immerse the transmission component is ensured by a coolant column that is configured to form in the hollow body.

17. The coolant supply system according to claim 2, wherein a leaked coolant collects at the bottom of the rotor chamber, on the coolant separator, and at least one rotor chamber drain point is formed, at the bottom of the rotor chamber, via which the coolant is configured to be returned to the coolant reservoir, by the return pump.

18. The coolant supply system according to claim 3, wherein a leaked coolant collects at the bottom of the rotor chamber on the coolant separator, and at least one rotor chamber drain point is formed, at the bottom of the rotor chamber, via which the coolant is configured to be returned to the coolant reservoir, by the return pump.

19. The coolant supply system according to claim 4, wherein a leaked coolant collects at the bottom of the rotor chamber on the coolant separator, and at least one rotor chamber drain point is formed, at the bottom of the rotor chamber, via which the coolant is configured to be returned to the coolant reservoir, by the return pump.

\* \* \* \* \*